United States Patent [19]

Behn

[11] 4,356,608

[45] Nov. 2, 1982

[54] METHOD FOR THE MANUFACTURE OF LAYER CAPACITORS

[75] Inventor: Reinhard Behn, Munich, Fed. Rep. of Germany

[73] Assignee: Siemens Aktiengesellschaft, Berlin & Munich, Fed. Rep. of Germany

[21] Appl. No.: 188,466

[22] Filed: Sep. 18, 1980

[30] Foreign Application Priority Data

Oct. 4, 1979 [DE] Fed. Rep. of Germany ....... 2940337

[51] Int. Cl.³ .............................................. H01G 4/30
[52] U.S. Cl. ................................................. 29/25.42
[58] Field of Search ............... 29/25.42; 361/308, 309, 361/310, 311, 330, 329, 328

[56] References Cited

U.S. PATENT DOCUMENTS

| | | | |
|---|---|---|---|
| 2,398,176 | 4/1946 | Deyrup | 361/308 |
| 3,129,490 | 4/1964 | Rollefson | 361/310 |
| 3,304,475 | 2/1967 | Gowen et al. | 29/25.42 |

FOREIGN PATENT DOCUMENTS 689746  6/1964  Canada .................................. 361/309

Primary Examiner—Lowell A. Larson
Attorney, Agent, or Firm—Hill, Van Santen, Steadman, Chiara & Simpson

[57] ABSTRACT

A method of manufacturing layer or film capacitors is disclosed wherein a carrier is separated from an insulating material plate which is metal-coated on both sides. A cut surface of the carrier is coated with coating layers and glow polymerization layers. The capacitors are conveniently manufactured and insulated on all sides since metal-free strips which are parallel to one another are applied to the metal-coated insulating material plate before the separation. Contact surfaces are formed by means of the separation from the metal layer. The carriers are then encapsulated on all sides and subsequently are separated into individual capacitors in the area of the metal-free strips.

7 Claims, 3 Drawing Figures

METHOD FOR THE MANUFACTURE OF LAYER CAPACITORS

BACKGROUND OF THE INVENTION

The present invention relates to a method for the manufacture of layer or film capacitors in which metal layers are applied to both sides of an insulating plate. Strip-shaped carriers which have metal layers on opposite sides are separated from this insulating plate. Coating layers consisting of metal and glow polymerization layers are applied to cut surfaces of the carriers. The coating layers alternately overlap the edges of a respective one of the metal layers. Connection elements are soldered to the metal layers whereby the electrically conductive layers on the carriers are covered by means of layers of insulating material, and whereby the carriers are finally separated into individual capacitors.

Given such a capacitor which, in particular, is built for very small dimensions, the demand for an all around complete insulation often occurs. In comparison to the remaining expense for the manufacture of this capacitor, the expense for an insulation according to traditional immersion of whirl sintering methods is very high.

SUMMARY OF THE INVENTION

An object underlying the present invention is to provide a simple and inexpensive method for manufacturing a capacitor of the type initially described in a form which is insulated on all sides.

This object is achieved according to the invention by means of the following method steps and their sequence:

1. Metal-free strips which are parallel to one another are generated in the metal layers on the insulating plate, whereby the corresponding strips lie opposite one another on the two sides of the plate of insulating material.
2. The carriers are separated from the plate in a direction intersecting the metal-free strips, so that connection surfaces arise on the carriers.
3. The coating layers and the glow discharge polymerization layers are applied to the carrier in such manner that the coating layers of one polarity are respectively electrically connected to only one connection surface.
4. Connection elements are soldered or welded to the connection surfaces.
5. The carriers are encapsulated on all sides with insulating material.
6. The individual capacitors are opened up by application of a voltage and tested, the individual capacitors being separated from the carrier in the area of the metal-free strips in such manner that none of the connection surfaces is cut or exposed.

Advantageously, terminal lugs connected to one another and of one piece construction are soldered or welded onto the connection surfaces as connection elements in the form of combs and the backs of these combs are separated directly before the opening up and testing to such a degree that the terminal lugs are no longer connected to one another as one piece. By so doing, a logical fabrication and a reproduceable position of the terminal lugs with respect to one another is guaranteed. The latter is required for a contacting of the terminal lugs for opening up and testing in an adapter. The latter can contact all capacitors of a carrier simultaneously.

By means of this method, capacitors which are encapsulated on all sides are manufactured collectively on the carrier and are subsequently separated without having bare metal parts arise. By means of the proposed method, marking with data and the testing of the capacitors can also be carried out before their separation into individual capacitors and can ensue simultaneously for all capacitors of a carrier. Thereby, for example, approximately 100 capacitors can be manufactured from one carrier.

Copper is advantageously employed for the metal layers. This can already be tinned for a solder connection, for example, before the application of the metal-free strips, or can be tinned after the application of the metal-free strips. The metal-free strips are advantageously milled or etched in.

The encapsulation can ensue, for example, by means of immersion or coating or by means of an encapsulation by means of whirl sintering.

By "opening up" the capacitor it is meant that a voltage load of increasing voltage is applied to the capacitors whereby short circuits or defective locations in the capacitors burn out without producing an impermissable damage to the capacitor.

An advantageous development of the method of the invention is that two or more carriers are arranged above one another after the application of the coating layers and glow polymerization layers. Common connection elements of corresponding length are soldered or welded to each carrier to a respective corresponding connection surface. The carriers connected to one another in that manner by means of the connection elements are subjected in common to the remaining process steps. Capacitors with higher capacitance values can be generated by so doing. This is advantageous, on the one hand, since the number of the coatings and dielectric layers cannot be increased at random without further ado and, on the other hand, renders it possible to realize a multitude of capacitance values with only a few, standardized layer sequences and layer numbers per carrier. Moreover, the dimensions of the individual capacitors can be matched to desired dimensions by means of this embodiment.

In order to avoid exposing the metal layers when separating into individual capacitors, the metal-free strips are made broader than the cutting width of the cutting tools employed for separation into individual capacitors.

DESCRIPTION OF THE PREFERRED EMBODIMENTS

Figure 1:
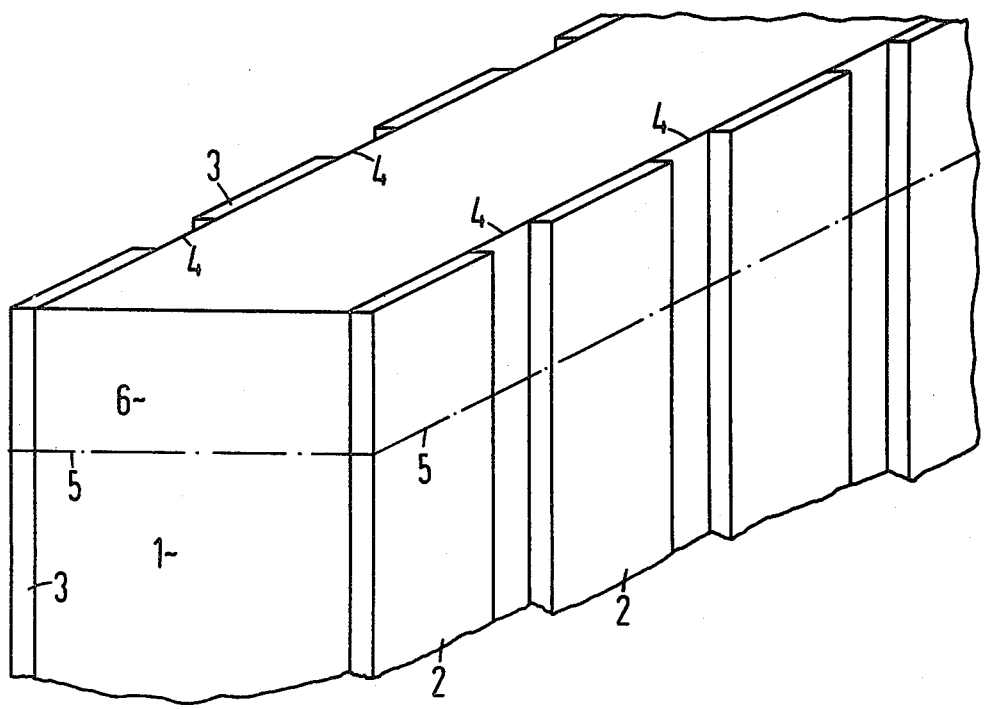
FIG. 1 shows an insulating plate with metal layers applied to both sides in a partially segmented view.
Figure 2:
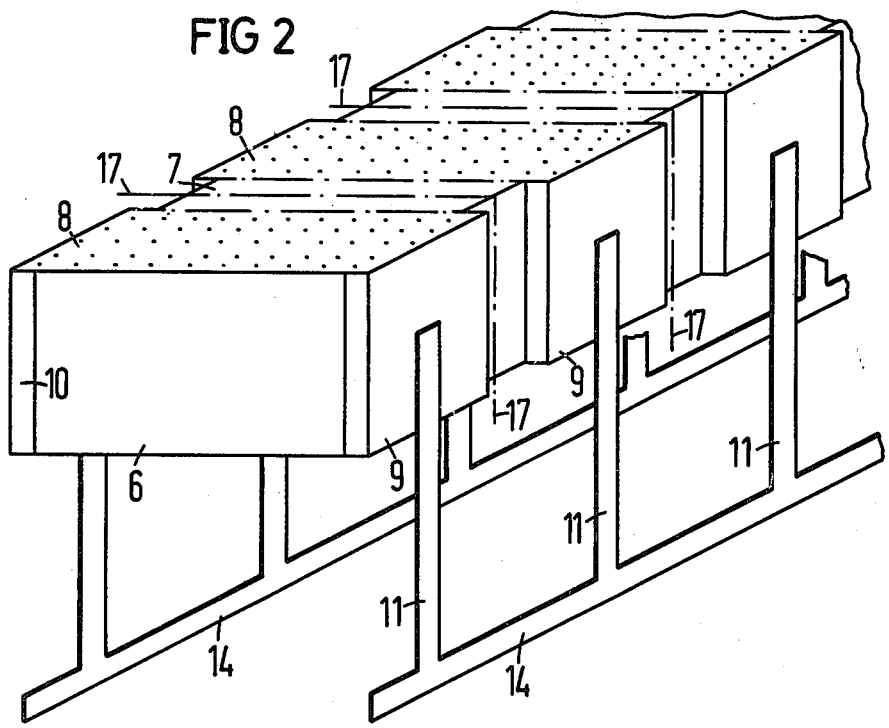
FIG. 2 shows a carrier before encapsulation in a partially segmented view.

Metal layers 2 or, respectively, 3 are applied on both sides to an insulating plate 1. Metal-free strips 4 are milled or etched into the metal layers 2, or respectively 3. Carriers 6 are separated from this insulating plate 1 along the separating lines 5. Coating layers and glow or discharge polymerization layers as the layers of the capacitor providing the capacitance are applied to at least one cut surface 7 of these carriers 6, said coating layers and glow or discharge polymerization layers forming a layer sequence 8 and corresponding layers at least overlapping the end faces of the respective metal layers 2 or 3. British Pat. No. 970,865, incorporated herein by reference, provides an example of layer sequences to form the active capacitance portion of the capacitor. This is well known in the art and hence is not further described. The parts of the metal layers 2 or, respectively, 3 situated on the carrier serve as contact surfaces 9 or, respectively, 10 to which the connection elements 11 or, respectively, 12 are soldered or welded. The connection elements 11, like the connection elements 12, are connected to one another in one piece in the form of a comb. After the application of an encapsulation 13, the backs 14 of the combs are removed in such manner that the connection elements 11 or, respectively, 12 are no longer connected to one another in one piece. Therefore, for purposes of a special shaping of the connection elements, one part of the backs 14 can remain on the connection elements 11 or, respectively, 12. Thereafter the opening-up and testing is performed.

The individual capacitors are now separated from the carrier along the separating lines 17 in such manner that the connection surfaces 9, or respectively, 10 are not cut or exposed. There thus derives a completely insulated component, whereby only the connection wires themselves are accessible to an electrical contact. The encapsulation ensues by means of coating or extrusion-coating, or by means of dusting synthetic powder in a whirl sintering bath and subsequent smooth-melting of the powder.

Figure 3:
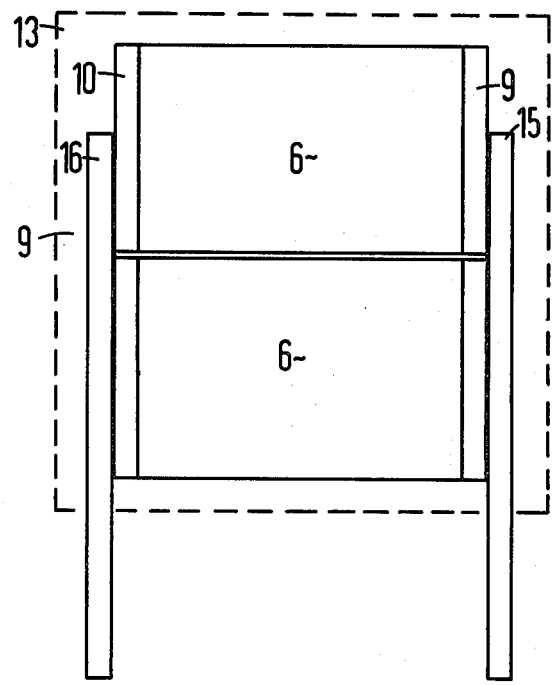
FIG. 3 shows two carriers arranged above one another in which corresponding contact surfaces are connected to one another by means of contact elements. The encapsulation is illustrated with broken lines.

According to FIG. 3, two carriers 6 are arranged above one another. Their contact surfaces 9 and 10 are connected to be electrically conductive and mechanically rigid with one another by means of common connection elements 15 or, respectively 16. The encapsulation 13 encompasses both carriers, so that one component with a higher capacitance value arises which, among other things, requires relatively little space on a printed circuit in which the connection elements are to be plugged.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A method for manufacturing layer or film capacitors, comprising the steps of: providing an insulating plate having metal layers on opposite sides thereof; creating metal-free strip zones which are parallel to one another in the metal layers on the insulating plate such that adjacent metal strips are formed on the two sides of the insulating plate; providing strip-shaped carriers by cutting the plate in a direction intersecting the metal-free strip zones so that opposite connection surfaces are created on the carrier strips together with cut surfaces; applying vapor-deposited metal coating layers and glow polymerization layers on the cut surfaces of the strip-shaped carriers such that each of the coating layers alternately overlaps one of the glow polymerization layers and such that the coating layers of respective polarities are respectively electrically conductively connected to the respective one connection surface; bonding connection elements to the connection surfaces; encapsulating the carrier strips on all sides with insulating material; opening-up the individual capacitors of the carrier strips by applying a voltage thereto; testing the individual capacitors of the carrier strips; and separating the individual capacitors from the carrier strip in the area of the metal-free strip zones in such manner that none of the connection surfaces or coating layers are cut or exposed.

2. A method according to claim 1 wherein the connection elements are connected to one another as one piece in the form of combs, and that backs of the combs are removed directly before the opening-up and the testing to such degree that the terminal lugs are no longer connected as one piece to one another.

3. A method according to claim 1 wherein two or more carrier strips are arranged above one another after the application of the coating layers and the glow polymerization layers; common connection elements of corresponding length are bonded to each carrier strip at respectively corresponding connection surfaces; and the carrier strips connected to one another by the connection elements are subjected to the remaining method steps.

4. A method according to claim 1 wherein after the encapsulation and before the separation of individual capacitors, the carrier strips are marked with data for the individual capacitors such that the data can be read on each individual capacitor.

5. A method according to claim 1 wherein the connection elements are welded to the connection surfaces.

6. The method of claim 1 wherein the connection elements are soldered to the connection surfaces.

7. A method for manufacturing film capacitors, comprising the steps of: providing an insulating plate and depositing metal layers on opposite major sides of the plate; removing portions of the metal layers to create metal-free strip zones which are parallel to one another and thus form parallel metal strips on both sides of the insulating plate; providing strip-shaped carriers by cutting the plate in a direction perpendicular to the metal strips so as to form opposite connection surfaces on the carrier strips together with cut surfaces perpendicular to the strips; alternately applying vapor-deposited metal coating layers and glow polymerization insulating layers on the cut surfaces such that the metal coating layers alternately overlap corresponding strip zones on the opposite sides of the carrier strips so as to form a capacitively active region and such that coating layer-free zones are created corresponding to the metal-free strip zones; bonding connection elements to the connection surfaces; encapsulating the carrier strips on all sides with insulating material; testing the individual capacitors of a given carrier strip; and separating the carrier strips into individual capacitors by cutting the carrier strip parallel to the metal strips and in the area of the metal-free strip zones so that none of the connection surfaces or coating layers are cut or exposed.

* * * * *